Nov. 10, 1925.

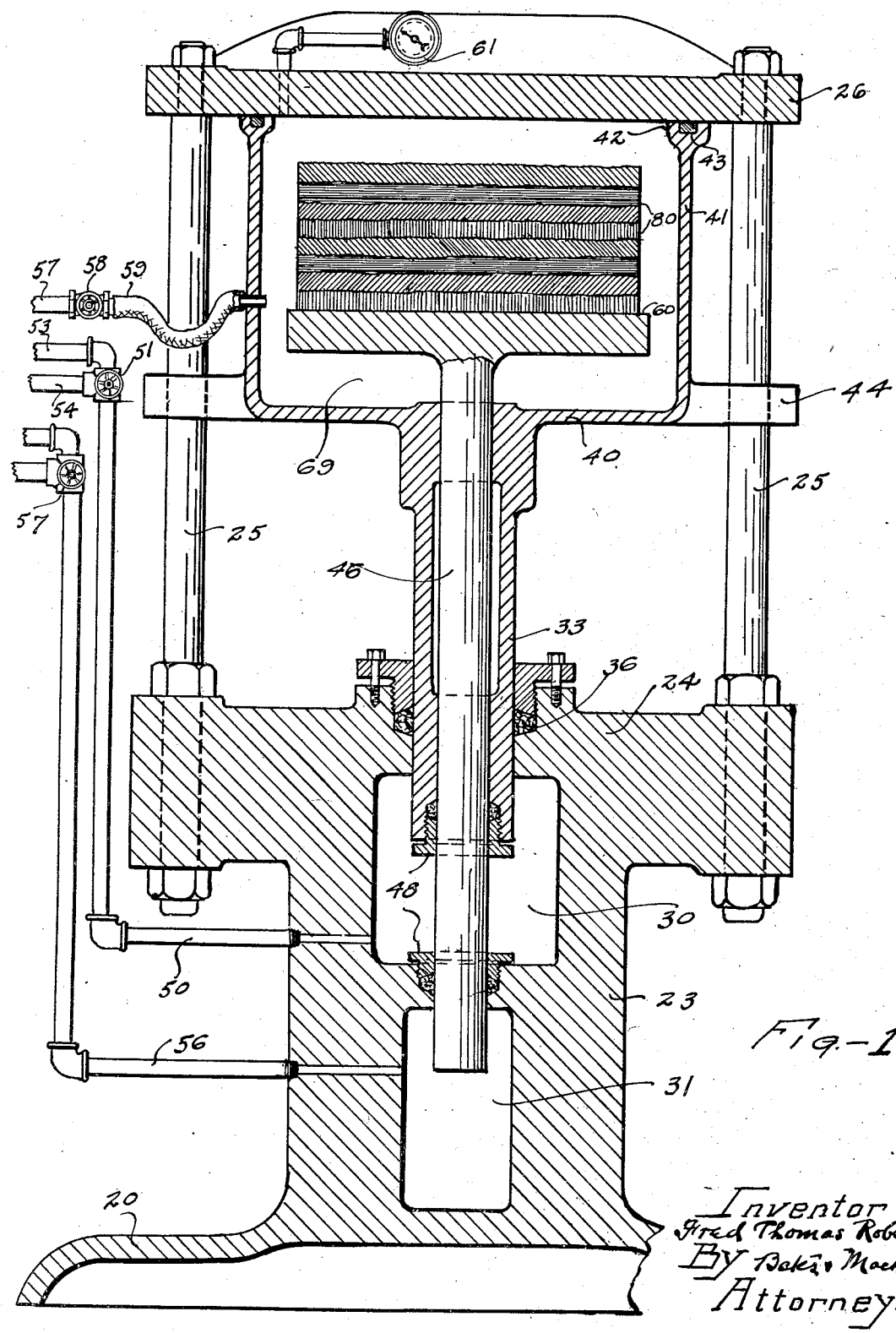

F. T. ROBERTS 1,560,862

METHOD OF MAKING VARIEGATED RUBBER

Filed Sept. 13, 1920  2 Sheets-Sheet 2

Inventor
Fred Thomas Roberts
BY Bakes & Macklin
Attorneys.

Patented Nov. 10, 1925.

1,560,862

UNITED STATES PATENT OFFICE.

FRED THOMAS ROBERTS, OF CLEVELAND, OHIO.

METHOD OF MAKING VARIEGATED RUBBER.

Application filed September 13, 1920. Serial No. 409,846.

*To all whom it may concern:*

Be it known that I, FRED THOMAS ROBERTS, a citizen of the United States, residing at Cleveland, in the county of Cuyahoga and State of Ohio, have invented a certain new and useful Improvement in Methods of Making Variegated Rubber, of which the following is a full, clear, and exact description, reference being had to the accompanying drawings.

This invention relates to the production of laminated or striated rubber wherein there are a plurality of zones differing in appearance from each other, thus enabling the ready manufacture of articles of pleasing appearance.

The object of the invention is to provide a laminated or striated block of rubber which if cut transversely will produce a piece having stripes or other adjacent regions of different characteristics. Thus a sheet may be made with stripes of different colors from which articles may be manufactured, which will have a pleasing variegated effect.

In my process I exhaust the air between the successive sheets of rubber so that a compact block is obtained and there is an effective uniting of each sheet to the adjacent one. When such a block is sliced crosswise a sheet of rubber is obtained wherein the grain of the rubbr is on edge rather than flatwise. This gives a sheet which for many classes of work has advantages, among which may be mentioned that the sheet will stretch equally in all directions. Various effects may be obtained by building up the block from rubbers of different grades, and as stated a pronounced striped appearance may be produced by using different colors for the original sheets.

Broadly stated my process comprises superimposing and uniting the sheets while exhausting the air between them to form a block and thereafter cutting the block transversely. In performing such process I prefer to place a plurality of superimposed layers or pieces of rubber in a chamber; then close the chamber in an air-tight manner; then exhaust the air from the chamber while mechanically pressing the sheets together, and finally opening the chamber and slicing the block transversely.

Figure 3:
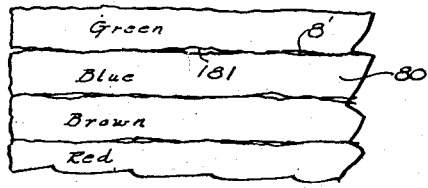
Figure 4:
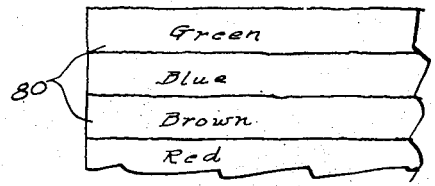
Figure 2:
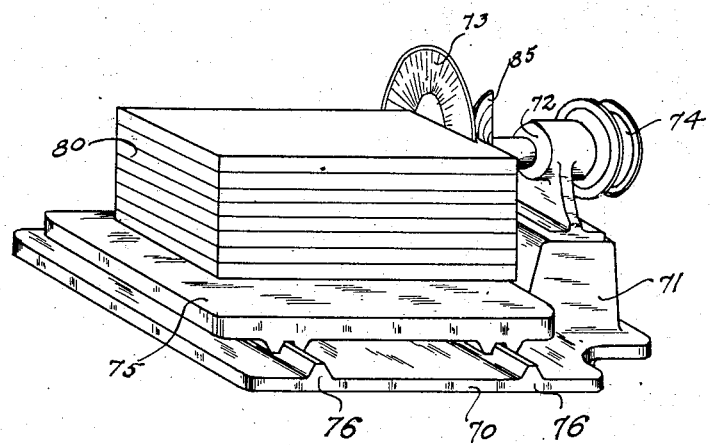
Figure 5:
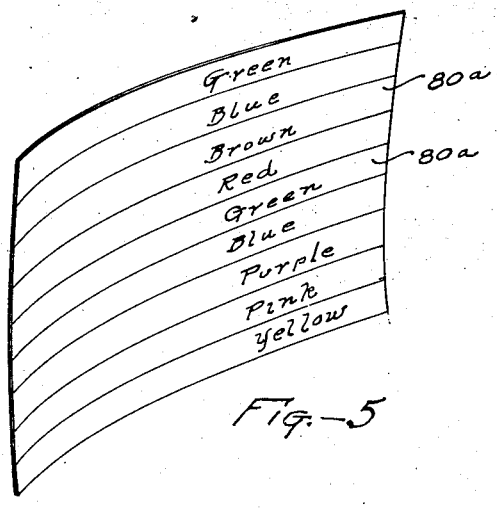
Figure 6:
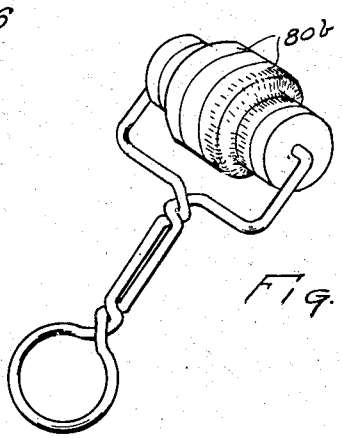

The drawings illustrate my invention by showing apparatus which may be employed in carrying it out, and showing the product in various stages. Fig. 1 is a vertical section of a machine for pressing the layers while exhausting the air between them; Fig. 2 is a perspective of a machine for slicing the formed block; Figs. 3 and 4 are fragmentary views illustrating the laminations respectively before and after the exhaustion of air; Fig. 5 is a view of the finished sheet; Fig. 6 is a perspective of a hollow rattle formed of such variegated sheets.

In Fig. 1 in the drawings 20 indicates the base of a press member and extending from this base 20 I have shown a post 23 and forming an extension of the post a shoulder or head 24. A plurality of standards 25 are shown as extending upwardly from the head 24, and the standards support at their upper ends a head 26. The post is shown provided with a plurality of chambers 30 and 31, the upper of which has mounted therein, for reciprocation, a plunger 33. A tight joint is afforded between the plunger and the head 24 by means of packing 36 which may be suitably held in place as shown.

A receptacle member 40 may be carried by the upper end of the plunger, the side walls of the receptacle being shown as enlarged adjacent the upper end thereof as shown at 41 and provided with a gasket 42, which, in operative position, contacts with and makes a pneumatic seal with the lower face of the head 26, as clearly shown in Fig. 1. The container-like member 40 may be provided with lugs 44 shown as apertured to fit and slide on the rods 25.

The plunger 33 is indicated as hollow, and shown as extending thru the center thereof is a second plunger 46. This latter plunger is shown as communicating with the lower chamber in the post 23, suitable packing being provided at 48 to secure a tight fit.

To operate the plungers suitable fluid pressure means may be employed. I have shown at 50 a supply and discharge pipe for the upper chamber which operates the outer plunger. The pipe 50 may be provided with a two-way valve, shown at 51, whereby the plunger-operating fluid may be supplied from the pipe 53 or discharged thru the pipe 54. I have shown at 56 a supply and discharge pipe for the inner plunger, and a valve 57 which controls the supply and discharge for the pipe 56.

A pipe 57 connected to a vacuum-producing means is shown as controlled by the valve 58 and may be connected by means of a flexible coupling 59 with the container member 40.

The upper portion of the plunger 46 is shown as provided with a substantially flat upper platen 60 which may be parallel to the lower portion of the head member 26 with which the gasket carried by the container member 41 contacts. In its upper position the plunger 48 causes the container 41, in conjunction with the head, to form a chamber from which the air may be exhausted thru the connection to the vacuum-producing means, controlled by the valve 48. The head 26 is shown as having a pressure gauge 61 carried thereby and in communication with the chamber formed by the container member 41.

In Fig. 2 I have shown a means for cutting sheets of rubber from a block. A base member 70 is shown as having a standard 71 thereon, on which is supported a suitable bearing 72, in which is a shaft carrying a rotary knife 73. The shaft may be rotated by a belt on the pulley 74. The base 70 may be provided with ribs 76, each adapted to co-operate with a channel formed by a pair of similar ribs upon a table 75. The table 75, which may carry the block of rubber, is thus mounted to slide back and forth on the base 70.

In carrying out my method, I place upon the platen 60 a plurality of sheets of rubber 80 or similar stock having their surfaces softened by benzole or with rubber adhesive applied thereto. These sheets have distinctive characteristics and are arranged according to the manner in which it is desired that the finished sheet may appear. In Fig. 3 I have shown a number of such superimposed sheets having the air pockets therebetween 81, which exists when sheets are laid one upon the other.

After the sheets have been arranged as desired the valve 51 is operated to cause the plunger 33 to move against the lower face of the head 26 and thus provide a closed chamber 69. The valve 58 is next operated to establish communication between the suction pipe 57 and the chamber 69, and thereby exhaust the air from the chamber. The removal of the air from the chamber removes the pockets of air 81 which form between the sheets of material 80.

The air having been exhausted the valve 57 is operated to cause the plunger 46 to be raised. This causes the superimposed sheets of rubber stock to be squeezed between the platen 60 and the head 26, and to be securely united to form a solid block of rubber having laminations or striations of different characteristics. In Fig. 4 I have shown a fragment of a block of rubber. In this figure it will be noted that all the air pockets have been removed.

One of the next steps in my process is to take a block and cut therefrom sheets or slices. The sheets or slices are cut so as to intersect two or more laminations or striations and thereby produce a sheet having the distinctive characteristics of the individual sheets.

In slicing the block with a machine such as shown in Fig. 2, the block is placed upon the table 75 and the latter moved towards the knife 73. The slice 85 may be of any thickness desired depending upon the purpose for which the material is desired.

In Fig. 5 I have shown a sheet of the variegated stock which has been cut from a block 80, and has the corresponding stripes 80$^a$.

The variegated sheet stock may be used in any manufacture desired. I find it very convenient to employ it in a process where sheet rubber is pneumatically seated in mold cavities, two portions of such seated stock being then joined to form a complete article; for example, after the manner of my Patent No. 1,201,502, granted October 17, 1916. In Fig. 6 I have shown a child's rattle, which may be made by such process, from a variegated sheet such as shown in Fig. 5, the stripes 80$^b$ being shown as running around the article.

Having thus described my invention, I claim:

1. The method of making variegated rubber which comprises placing layers of different colors upon a member, causing a chamber to be formed about said member and layers, exhausting the air from the chamber, thereafter pressing the layers together and slicing the block so formed across the layers to form a sheet having portions of such layers as striations therein.

2. The method of making sheets of variegated rubber which comprises associating a plurality of portions of rubber, removing the air from between the portions and uniting them to form a solid block, and thereafter slicing across the block through the plurality of portions to form a variegated sheet, the portions forming the sheet having the same relation one with the other that they had in the original block.

3. The method of making striated rubber comprising superimposing layers of different characteristics, uniting them by pressure while exhausting the air between them to form a block, and thereafter cutting the block transversely.

4. The method of making a sheet of variegated rubber, which comprises superimposing a plurality of layers of different colors one upon the other, causing a vacuum to be produced about the layers, uniting the layers to form a block, and thereafter slicing across the block to form a sheet.

5. The method of making a sheet of rubber comprising uniting by mechanical pressure and in an atmosphere of reduced air pressure a plurality of pieces of rubber having different characteristics to form a block and then cutting the block across the pieces to form sheets.

6. The method of making a sheet of variegated rubber comprising uniting in a vacuum by pressure a plurality of pieces of rubber having different color characteristics to form a block and then cutting the block to form sheets having portions of such layers as striations therein.

7. The method of making variegated sheet rubber comprising placing a plurality of superimposed layers or pieces of rubber in a chamber, closing the chamber in an airtight manner, exhausting the air from the chamber while mechanically pressing the sheets together, and finally opening the chamber and slicing the block transversely of the layers.

8. The method of making sheets of rubber which comprises associating a plurality of portions of rubber, exhausting the air from between such portions by suction and uniting them by pressure to form a solid block and thereafter slicing across the block through the plurality of portions to form a sheet, the portions forming the produced sheet having the same relation one with the other that they had in the block.

9. The method of making sheet rubber comprising superimposing layers of rubber, exhausting the air by suction between them and uniting them by mechanical pressure, and thereafter cutting the block transversely.

10. The method of making sheet rubber comprising superimposing layers of rubber, causing a vacuum to be produced about the blocks so formed, pressing the layers together, and thereafter slicing across the block.

11. The method of making sheet rubber comprising uniting by mechanical pressure and in an atmosphere of reduced air pressure a plurality of sheets of rubber to form a block, and then cutting the block crosswise into sheets.

12. The method of making sheet rubber comprising superimposing layers of sheet, causing a chamber to be formed about such built up block, exhausting the air from the chamber, pressing the layers together, and thereafter cutting the composite block crosswise.

13. The method of making sheet rubber comprising uniting sheets by pressure while subjecting them to a surrounding atmosphere of reduced air pressure, and thereafter cutting the block crosswise.

14. The method of making rubber comprising forming a mass of rubber from thin sheets secured together by pressure while exposed to a surrounding partial vacuum, and thereafter cutting such mass crosswise into thin sheets.

In testimony whereof, I hereunto affix my signature.

FRED THOMAS ROBERTS.